(12) United States Patent
Chundi et al.

(10) Patent No.: US 12,511,286 B2
(45) Date of Patent: *Dec. 30, 2025

(54) METHODS AND SYSTEMS FOR MODIFYNG A SEARCH QUERY HAVING A NON-CHARACTER-BASED INPUT

(71) Applicant: Adeia Guides Inc., San Jose, CA (US)

(72) Inventors: Charishma Chundi, Andhra Pradesh (IN); Susanto Sen, Karnataka (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,565

(22) Filed: Jul. 1, 2024

(65) Prior Publication Data
US 2024/0419662 A1    Dec. 19, 2024

Related U.S. Application Data

(63) Continuation of application No. 18/207,896, filed on Jun. 9, 2023, now Pat. No. 12,056,122, which is a continuation of application No. 17/873,996, filed on Jul. 26, 2022, now Pat. No. 11,714,809, which is a continuation of application No. 16/828,653, filed on Mar. 24, 2020, now Pat. No. 11,423,019.

(51) Int. Cl.
*G06F 16/2453*  (2019.01)
*G06F 16/248*  (2019.01)
*G06F 16/3329*  (2025.01)

(52) U.S. Cl.
CPC ...... *G06F 16/24534* (2019.01); *G06F 16/248* (2019.01); *G06F 16/3329* (2019.01)

(58) Field of Classification Search
CPC ............ G06F 16/24534; G06F 16/248; G06F 16/3329
See application file for complete search history.

(56) References Cited

U.S. PATENT DOCUMENTS

| | | | |
|---|---|---|---|
| 7,266,782 | B2 | 9/2007 | Hull et al. |
| 8,819,000 | B1 | 8/2014 | Acharya et al. |
| 11,087,424 | B1 | 8/2021 | Sarkar et al. |
| 11,423,019 | B2 | 8/2022 | Chundi et al. |
| 11,714,809 | B2 | 8/2023 | Chundi et al. |
| 12,056,122 | B2 | 8/2024 | Chundi et al. |
| 2008/0005091 | A1 | 1/2008 | Lawler et al. |

(Continued)

OTHER PUBLICATIONS

International Search Report and Written Opinion for International Application No. PCT/US2020/066442, dated May 19, 2021 (12 pages).

*Primary Examiner* — Jorge A Casanova
(74) *Attorney, Agent, or Firm* — HALEY GUILIANO LLP

(57) ABSTRACT

A method and system are provided for searching a search query having a non-character-based input. The method comprises receiving the search query comprising a first part and a second part. The first part comprises a non-character-based input. The method further comprises identifying a first plurality of keywords associated with the non-character-based input and receiving a selection of at least one of the first plurality of keywords. The method further comprises generating a modified search query comprising the at least one selected keyword and the second part. The method further comprises retrieving search results based on the modified search query and generating for presentation the search results.

20 Claims, 9 Drawing Sheets

(56) References Cited

U.S. PATENT DOCUMENTS

| | | |
|---|---|---|
| 2011/0167053 A1 | 7/2011 | Lawler et al. |
| 2012/0117051 A1 | 5/2012 | Liu et al. |
| 2012/0163710 A1 | 6/2012 | Skaff et al. |
| 2013/0080426 A1 | 3/2013 | Chen et al. |
| 2013/0106685 A1 | 5/2013 | Davis et al. |
| 2014/0093175 A1 | 4/2014 | Morimoto et al. |
| 2019/0095467 A1 | 3/2019 | Kislyuk et al. |
| 2021/0208741 A1 | 7/2021 | Yang et al. |
| 2021/0303568 A1 | 9/2021 | Chundi et al. |
| 2023/0089287 A1 | 3/2023 | Chundi et al. |
| 2023/0315729 A1 | 10/2023 | Chundi et al. |

METHODS AND SYSTEMS FOR MODIFYNG A SEARCH QUERY HAVING A NON-CHARACTER-BASED INPUT

CROSS-REFERENCE TO RELATED APPLICATIONS

This application is a continuation of U.S. patent application Ser. No. 18/207,896, filed Jun. 9, 2023, which is a continuation of U.S. patent application Ser. No. 17/873,996, filed Jul. 26, 2022, now U.S. Pat. No. 11,714,809, which is a continuation of U.S. patent application Ser. No. 16/828,653, filed Mar. 24, 2020, now U.S. Pat. No. 11,423,019, filed Mar. 24, 2020, the disclosures of which are hereby incorporated by reference herein in their entireties.

BACKGROUND

The present disclosure relates to searching a search query having a non-character-based input, and in particular, but not exclusively, relates to searching a search query having an image and character-based part.

SUMMARY

As the amount of content available to users for consumption continues to increase, the number of content items featuring actors, characters, locations, objects, or other entities grows. For example, as the amount of media content on a streaming service or a social media feed increases, a user may be exposed to content having an entity that they do not recognize or remember, e.g., an image of a particular location that they have not seen before or a clip of an actor or character that they are unable to remember the name of. In such cases, the user may have access to a representative image of the entity that they do not recognize or remember, or at least a characteristic of the entity (e.g., the color of the entity). However, simply performing a search based on the representative image can often return search results that are out of context or do not reflect the user's intent. The user may therefore not be able to search in an effective manner for the entity that they do not recognize or remember.

Systems and methods are provided herein for performing a search based on a non-character-based input combined with at least one of a character-based input and another non-character-based input. As used herein, the term "character-based input" is used to describe an input, e.g., an input into a search field, that contains a letter or symbol, such as one or more letters or symbols of an alphabetic writing system. The term "non-character-based input" is used to describe an input, e.g., an input into a search field, that contains at least one of an image, a shape, and a color.

According to the systems and methods provided herein, a search query is received, the search query comprising a first part and a second part, wherein the first part comprises a non-character-based input, e.g., an image of a scene from a movie. A first plurality of keywords associated with the non-character-based input is identified. A selection of at least one of the first plurality of keywords is received and a modified search query is generated. The modified search query includes the at least one selected keyword and the second part. Search results are retrieved based on the modified search query and generated for presentation.

In some embodiments, the second part comprises another non-character-based input, e.g., another image of a scene from a movie. In some embodiments, the second part comprises a character-based input, e.g., the name of a movie.

In some embodiments, metadata associated with the second part is determined. In some embodiments, the first plurality of keywords associated with the non-character-based input is identified based on the metadata associated with the second part.

In some embodiments, the first plurality of keywords and the second part are analyzed to determine an association, e.g., a correlation or a link, between at least one of the first plurality of keywords and the second part. In some embodiments, in response to determining the association between at least one of the first plurality of keywords and the second part, the first plurality of keywords are ranked, e.g., depending on a weighting of the association between at least one of the first plurality of keywords and the second part.

In some embodiments, a second plurality of keywords associated with the second part is identified. In some embodiments, the at least one selected keyword and the second plurality of keywords are analyzed to determine an association, e.g., a correlation or a link, between the at least one selected keyword and the second plurality of keywords. In some embodiments, in response to determining the association between the at least one selected keyword and the second plurality of keywords, the second plurality of keywords is ranked, e.g., depending on a weighting of the association between the at least one selected keyword and the second plurality of keywords. In some embodiments, a selection of at least one of the second plurality of keywords is received. In some embodiments, the generated modified search query comprises the at least one selected keyword from the first plurality of keywords and at least one selected keyword of the second plurality of keywords.

In some embodiments, in response to ranking the second plurality of keywords, at least one of the highest ranked keywords of the second plurality of keywords is automatically selected. In some embodiments, the generated modified search query comprises the at least one selected keyword from the first plurality of keywords and the at least one automatically selected keyword from the second plurality of keywords.

In some embodiments, a Boolean operation is performed on a plurality of the selected keywords, e.g., on at least one of: a plurality of the selected keywords from the first plurality of keywords; and a plurality of the selected keywords from the second plurality of keywords.

In some embodiments, where the first plurality of keywords associated with the non-character-based input have been identified, it is determined if the non-character-based input comprises at least one of a color, an image, and a shape.

In some embodiments, in response to determining that the non-character-based input comprises a color, a color detection module is run and at least one keyword associated with the color is retrieved. In some embodiments, in response to determining that the non-character-based input comprises at least one of an image and a shape, at least one keyword associated with at least one of the image and the shape is retrieved.

In some embodiments, in response to retrieving at least one keyword associated with the image, an image recognition module is run. In some embodiments, in response to retrieving at least one keyword associated with the image, at least one entity within the image is identified. In some embodiments, in response to retrieving at least one keyword associated with the image, at least one keyword associated with the entity is retrieved.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
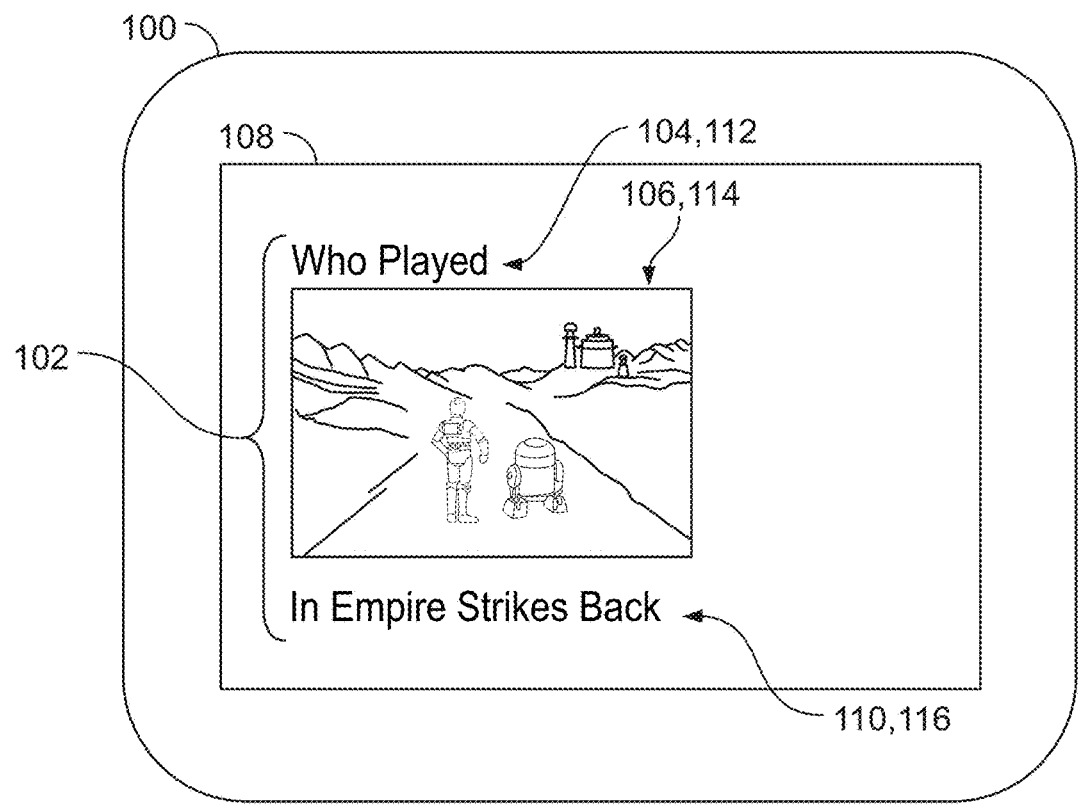
FIG. 1A illustrates an exemplary system and method for searching a search query having a non-character-based input, in accordance with some embodiments of the disclosure.

FIGS. 1A-1E illustrate an exemplary system and method for searching, e.g., on a user device 100, a search query 102 having at least a first part 104 and a second part 106. In the example shown in FIGS. 1A-1E, the user device 100 is a device configured to display a search field 108 into which a user can enter the search query 102, e.g., by virtue of one or more physical or verbal commands. The search field 108 may be any appropriate type of search field, such as a search field on a web page or on a dedicated piece of searching software, into which a user can enter one or more non-character-based search inputs (NCB inputs) and, optionally, one or more character-based search inputs (CB inputs).

The search query 102 in the example shown in FIGS. 1A-1E comprises a first part 104, a second part 106, and a third part 110. The first part 104 comprises a CB input 112 comprising the text "Who played". The second part 106 comprises an NCB input 114 comprising an image, which in this example is an image from the movie Star Wars: Episode VI—Return of the Jedi. However, the NCB input 114 may be any appropriate type of input containing an image, a shape, or a color (either separately or in combination). The user may acquire the image from any appropriate source, such as a screen grab performed by the user device 100. For example, the user may use at least one of an image palate and a color palate provided alongside the search field 108 to allow the user to choose an NCB input 114, e.g., from offline and online images and from a selection of colors for use in the search query. In one example, a user may drag and drop an image or color, or draw a shape into the search tab, while inputting the search query.

The third part 110 comprises another CB input 116 comprising the text "in Empire Strikes Back". Thus, in the example shown in FIGS. 1A-1E, the search query is made up from a first CB input 112, which goes before the NCB input 114, and a second CB input 116, which comes after the NCB input 114. However, the search query 102 may be formed from any appropriate number of CB inputs and NCB inputs arranged in any order desired by the user.

For the sake of clarity, it is understood that the use of the terms "first part", "second part", and "third part" are in relation to the order the CB inputs and the NCB input used in the example shown in FIGS. 1A-1E. It is understood that the present disclosure in no way limits the order or arrangement of CB and NCB inputs to that shown in any of the FIGS. or to that described in any of the examples disclosed herein.

Figure 1B:
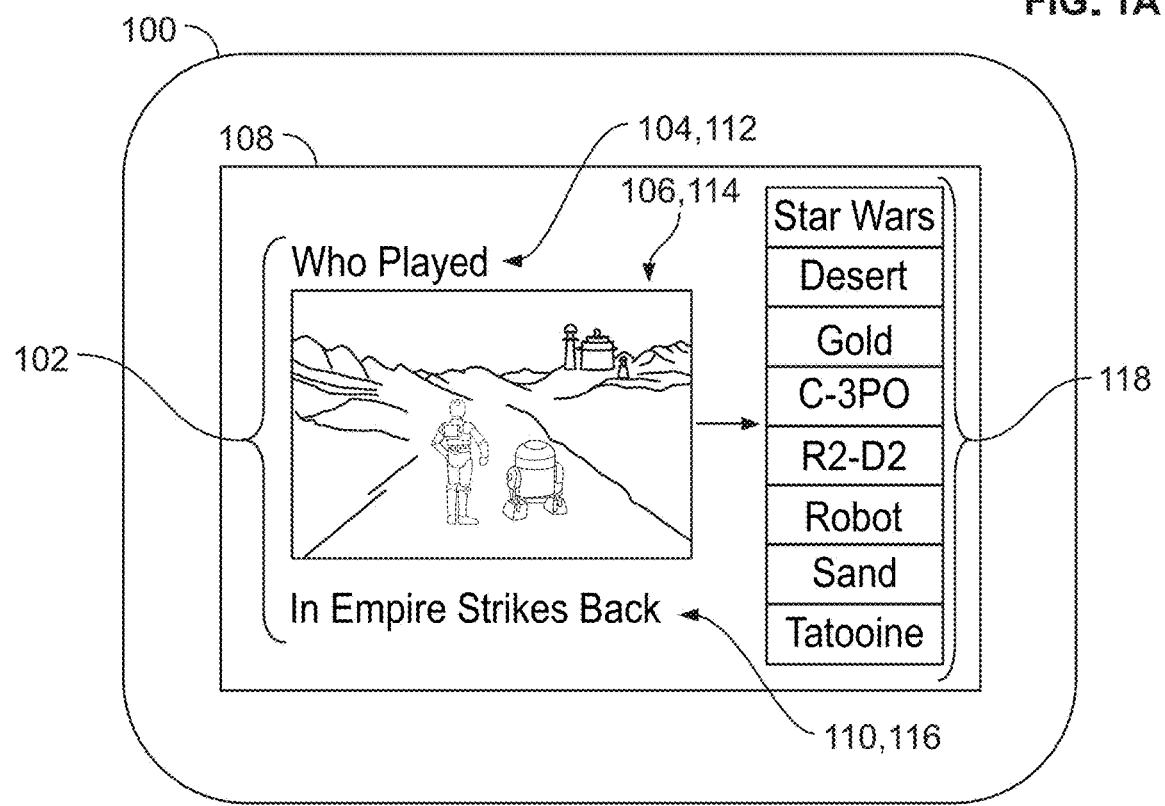
FIG. 1B further illustrates the exemplary system and method for searching a search query having a non-character-based input, in accordance with some embodiments of the disclosure.

In FIG. 1B, control circuitry of the user device 100 is used to identify a first plurality of keywords 118 associated with the NCB input 114, e.g., using at least one of an image recognition module, a color recognition module, a shape recognition module, and a crawler module. For example, the image recognition module may be used to identify that the image is an image from Star Wars: Episode VI—Return of the Jedi, and the crawler module may be used to identify keywords associated with the image. The control circuitry may be configured to access metadata associated with the image to identify the list of keywords 118. In one example, the image may have directly associated or embedded metadata in the form of one or more tags corresponding to various entities shown in the image. Additionally or alternatively, the control circuitry may be configured to access memory, e.g., a database, in order to identify the list of keywords based on metadata associated with the image, e.g., the image title and/or at least one tagged entity in the image. In the example shown in FIG. 1B, the list of keywords 118 is displayed for user selection in the search field 108, e.g., at a position adjacent to the image and in no particular order. In this example, the list of keywords 118 comprises the words: "Star Wars"; "Desert"; "Gold"; "C-3PO"; "R2-D2"; "Robot"; "Sand"; and "Tatooine". However, the list of keywords 118 is not limited to those shown in FIG. 1B. For example, where the list of keywords 118 comprises too many keywords to display in the search field 108, the control circuitry may be configured to limit the number of keywords to an appropriate number, e.g., by determined weight or relevance, so that the keywords can be easily presented to the user. Additionally or alternatively, the control circuitry may be configured to access memory, e.g., a database, in order to identify the list of keywords 118 based on metadata associated with at least one of the other parts of the search query 102, e.g., at least one of the CB inputs 112, 116 (or another NCB input). For example, in the example shown in FIG. 1B, the control circuitry may be configured to retrieve metadata associated with the text "Empire Strikes Back" that helps to define the context of the search input, e.g., a metadata retrieval module of the control circuitry may be used (in combination with memory, e.g., a database) to associate the text "Empire Strikes Back" with the terms "movie" and "entertainment". In this manner, the list of keywords 118 may be identified in the context of the fields of "movies" and "entertainment", such that the list of keywords 118 are more relevant to the user's search intent. In one example, the list of keywords 118 may be ranked, e.g., ordered, based on the relevance of each of the keywords 118 to the metadata describing one or more of the other search inputs. For example, where the list of keywords 118 is identified based on metadata associated with at least one of the other parts of the search query 102 and are ranked based on said metadata, the list of keywords 118 may comprise the words in the order of: "Star Wars"; "George Lucas"; "Science Fiction"; "C-3PO"; "R2-D2"; "Droid"; "Jabba's Palace"; and "Tatooine". In one example, some keywords that are less relevant (or not relevant at all), e.g., "Sand", may be placed towards the bottom of the list (or not displayed at all), e.g., where they fall below a certain relevance threshold.

Figure 1C:
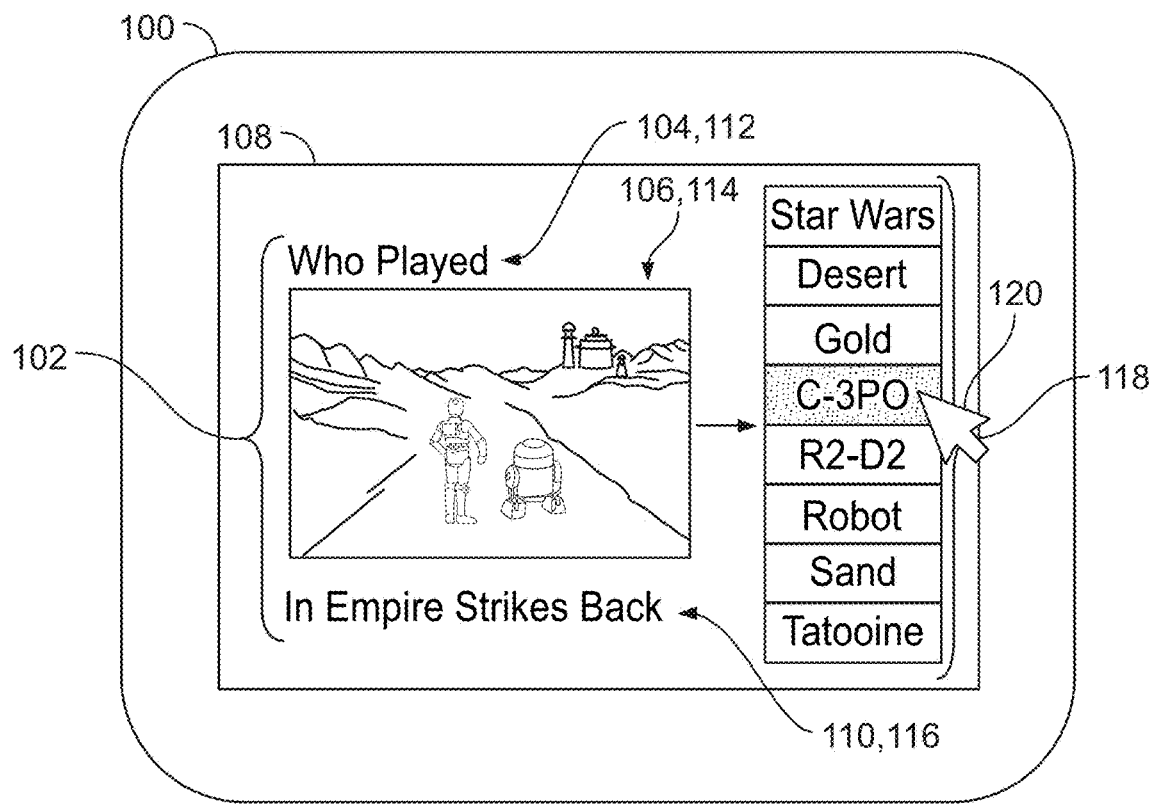
FIG. 1C further illustrates the exemplary system and method for searching a search query having a non-character-based input, in accordance with some embodiments of the disclosure.

In FIG. 1C, the control circuitry receives a selection of at least one of the keywords 118. In the example shown, the user selects, e.g., using cursor 120, the keyword "C-3PO", since this is the entity in the image which they are interested in (and could not remember the name of). In another example, the user may have used the image to represent a completely different query. For example, the user may have used the image to search for travel destinations having a similar appearance to the desert shown in the image, or for articles having a color similar to the gold color of the character C-3PO. In another example, the user may select more than one of the keywords 118. For example, the user may not recognize the name "C-3PO" as the name of the character, and may instead select the words "Gold" and "Robot" to indicate which entity in the image they are interested. If the user chooses multiple keywords 118, then the control circuitry may retrieve results using those keywords by considering their combinations by at least one user-selected Boolean operator, e.g., AND, OR, NOT, and AND NOT.

Figure 1D:
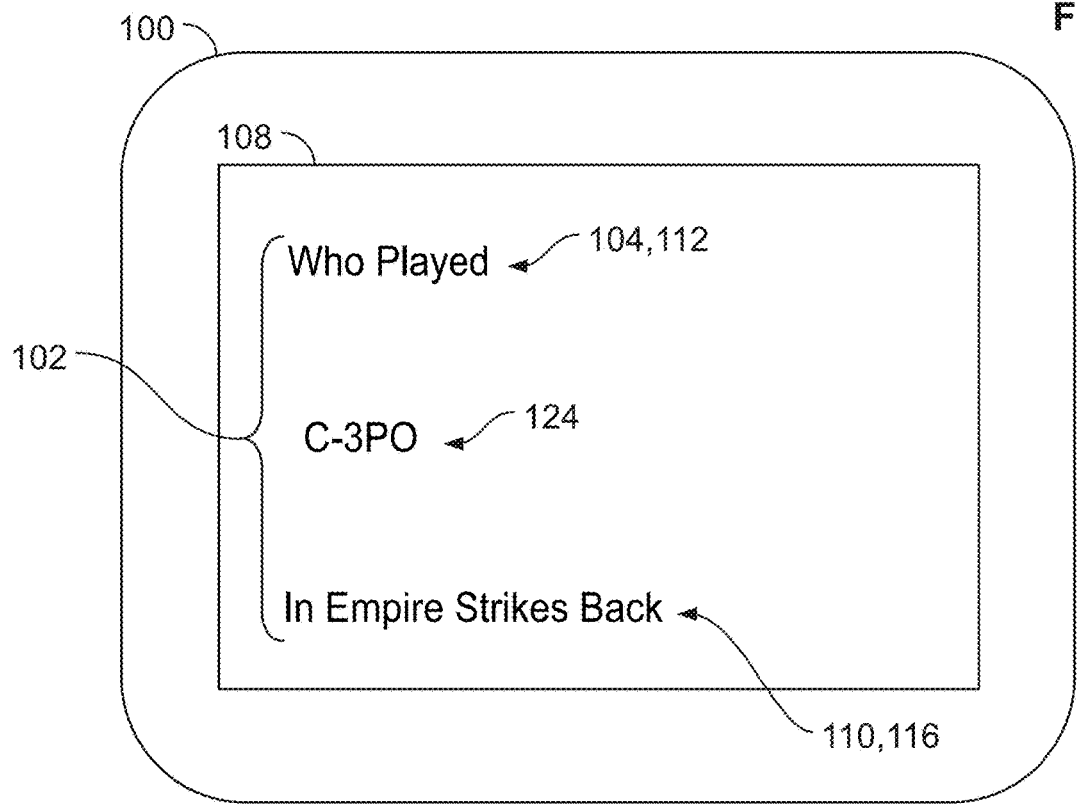
FIG. 1D further illustrates the exemplary system and method for searching a search query having a non-character-based input, in accordance with some embodiments of the disclosure.

In FIG. 1D, the control circuitry generates a modified search query 122 comprising the first part 104, the selected keyword 124 and the third part 110, such that the modified search query 122 comprises a character string made up from the first CB input 112, e.g., text "Who played", going before the selected keyword 124, e.g., "C-3PO", and the second CB input 116, e.g., the text "Empire Strikes Back" following after the selected keyword 124. In some examples, the user may wish to change the order of the character string. For example, the user may not have correctly ordered the first and second parts 104, 110 when inputting the initial search into the search field 108, or where the user chooses multiple keywords 118, they may not appear in the desired order in the search field 108. To account for this, the control circuitry may be configured to allow the user to re-order the character string in the modified search query 122, as desired.

Figure 1E:
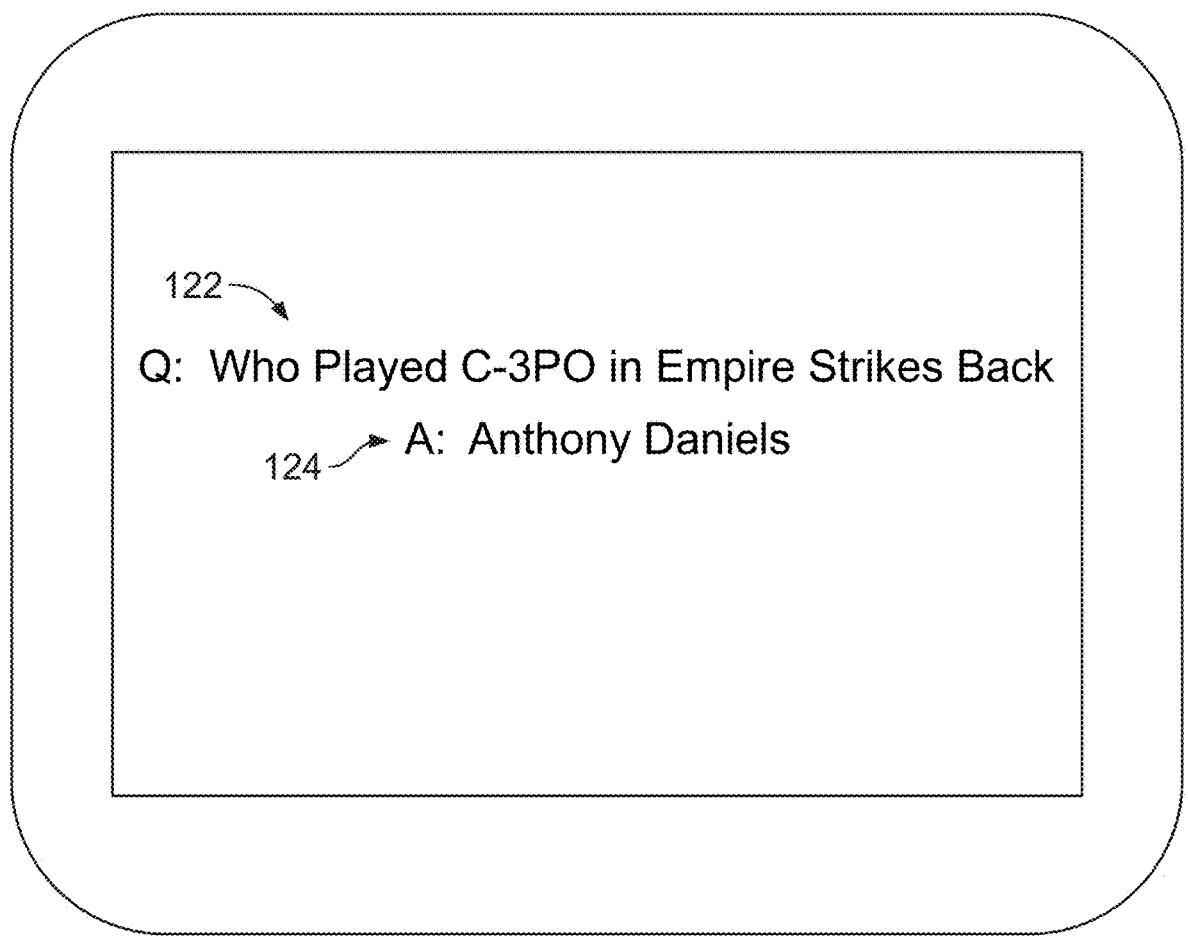
FIG. 1E further illustrates the exemplary system and method for searching a search query having a non-character-based input, in accordance with some embodiments of the disclosure.

In FIG. 1E, the control circuitry retrieves search result(s) 124 based on the modified search query 122 and generates the results 124, and optionally the modified search query 122, for presentation. For example, the control circuitry may be configured to display a re-formatted version of the modified search query 122 as "Q: Who played C-3PO in Empire Strikes Back" and display corresponding search result(s) 124 as "A: Anthony Daniels". Thus, according to the above outlined method, the system has been able to determine the answer to a query using a combination of a CB input and a NCB input, which is helpful where the user is unable to remember or does not know the name of an entity for which they wish to search. Importantly, the method allows for the user to select one or more keywords 118 that are associated with the NCB input so that meaningful search results are generated. For example, if a search method were to simply replace the image with a highest weighted keyword, the modified search query 124 may have read "Who played Star Wars in Empire Strikes Back", which would be nonsensical. The present disclosure therefore provides improved searching techniques, which result in a reduction of time and effort that a user expends when trying to retrieve an answer to a query.

In some examples, the control circuitry may be configured to cross reference at least one of the parts of the search query 102 with another of the parts of the search query 102, e.g., to refine the list of identified keywords 118. Taking the above example shown in FIGS. 1A-1E, the control circuitry may be configured to cross reference metadata associated with the NCB input 114 with metadata associated with at least one of the CB inputs 112, 116. For example, the control circuitry may be configured to identify metadata associated with the term "Empire Strikes Back" and determine that the search term relates to the topic of "Star Wars", or more generally the field of "movies". In order to refine the list of identified keywords 118, the control circuitry may be configured to limit the display of keywords 118 to those keywords that are associated with the metadata of the term "Empire Strikes Back". In this manner, the list of keywords may be limited to the context of the query posed by the user.

Figure 2:
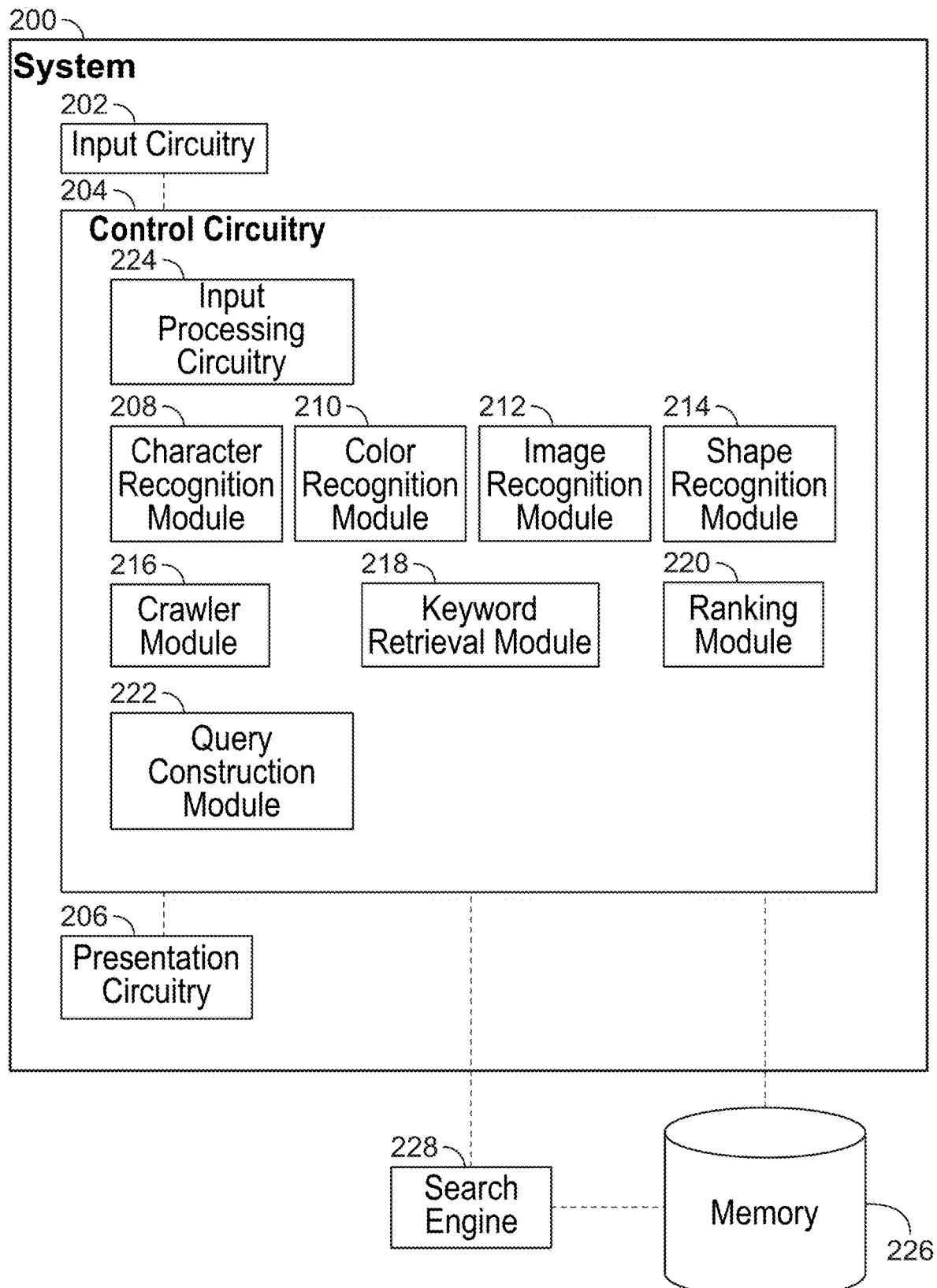
FIG. 2 is a block diagram showing components of an exemplary system for searching a search query having a non-character-based input, in accordance with some embodiments of the disclosure.

FIG. 2 is a block diagram showing components and data flow therebetween of an exemplary system 200 for searching a search query having an NCB input, in accordance with some embodiments of the disclosure. System 200, which may be any device, such as user device 100, capable of accepting user input, e.g., a smartphone, a tablet or a computer, and outputting for presentation search results. The system 200 comprises input circuitry 202, control circuitry 204, and presentation circuitry 206. The input circuitry 202 may comprise a keyboard or touchscreen interface. Alternatively, input circuitry 202 may comprise a wired (e.g., Ethernet) or wireless (e.g., WiFi, Bluetooth) data connection through which a user input is received from a user device or other device through which the user input is relayed, such as an Amazon® Echo® or other smart home device. The control circuitry 204 comprises at least one of: a character recognition module 208, a color recognition module 210, an image recognition module 212, a shape recognition module 214, a crawler module 216, a keyword retrieval module 218, a ranking module 220, a query construction module 222, and input processing circuitry 224. In the exemplary system 200, the control circuitry 204 is operationally connected to memory 226, e.g., remote or cloud-based memory, for information retrieval. However, in one or more other examples, memory 226 may be included as part of the system 200. Each of the components of the system 200 may be operationally connected to one or more of the other components of the system 200 either directly or indirectly to allow data to be transferred therebetween as required by the present disclosure, such as in any manner required by the exemplary processes shown in FIGS. 3 and 4. For example, each of the components of the system 200 may be operationally connected to one or more of the other components of the system 200 by virtue of a wired or wireless data connection, e.g., an Ethernet connection, a WiFi module, a Bluetooth module, etc. In this manner, it is envisaged that the system 200 need not be provided as part of the user device 100, which allows for one or more of the processes described herein to be performed either locally on the user device 100 or remote from the user device 100, e.g., at a remote server.

Control circuitry 204 may be based on any suitable processing circuitry and may comprise control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

In the exemplary system 200, the input circuitry 202 transmits a search input to control circuitry 204, where it is received, for example, using input processing circuitry 224. Input processing circuitry 224 may be configured to process the search input to identify one or more individual parts of the search input, e.g., one or more CB and NCB inputs. If a portion of the search input was received as a voice command, input processing circuitry 224 may first transcribe the voice command into a corresponding text string, e.g., into one or more CB inputs. Input processing circuitry 224 may include natural language processing circuitry or other linguistic analysis circuitry to identify parts of speech, phrases, proper nouns, or other linguistic features of the text input and determine an attribute or search parameter corresponding to each portion of the text input. Input processing circuitry 224 may transmit one or more received inputs to at least one of the character recognition module 208, the color recognition module 210, the image recognition module 212, and the shape recognition module 214, which are used to process the identified CB and NCB inputs, as appropriate. The crawler module 216 and the keyword retrieval module may receive data from at least one of the character recognition module 208, the color recognition module 210, the image recognition module 212, and the shape recognition module 214. The crawler module 216 and the keyword retrieval module may transmit a request to memory 226 for suggested keywords for each identified CB and NCB input. Memory 226 may be an electronic storage device such as random-access memory, read-only memory, hard drives, optical drives, solid state devices, quantum storage devices, or any other suitable fixed or removable storage devices, and/or any combination of the same. A database or other data structure may be stored in memory 226 containing metadata describing available content, relationships between various content items, actors, and other content descriptors, etc. In response to the request, suggested keywords may be received from memory 226. Alternatively or additionally, input processing circuitry 224 may transmit the request to transceiver circuitry (not shown). Transceiver circuitry may comprise a network connection over which data can be transmitted to and received from remote devices, such as an ethernet connection, WiFi connection, or connection employing any other suitable networking protocol. Transceiver circuitry may in turn transmit the request to memory 226. Presentation circuitry 206 may be configured to output for display at a user device a search query having the original search inputs with respective suggested keywords. Input processing circuitry 224 may be configured to receive an input of one or more selected keyword of the suggested keywords, e.g., via input circuitry 202. Query construction module 222 may be configured to construct a modified search query based on one or more of the selected keywords, e.g., in combination with one or more CB inputs of the original search query. The query construction module 222 may transmit, e.g., using transceiver circuitry, the constructed modified search query to search engine 228 to process the modified search query. In the exemplary system 200, the search engine 228 is remote from the user device, e.g., at a remote server, and does not form part of the system 200. However, in one or more alternative examples, the control circuitry 204 may comprise a search engine module that is in communication with memory 226, e.g., by virtue of transceiver circuitry. The control circuitry 204 may be configured to receive search results from the search engine 228 and transmit the search results to presentation circuitry 206. Presentation circuitry 206 may be any video or graphics processing circuitry suitable for generating an image for display on display device associated with control circuitry 204.

Figure 3:
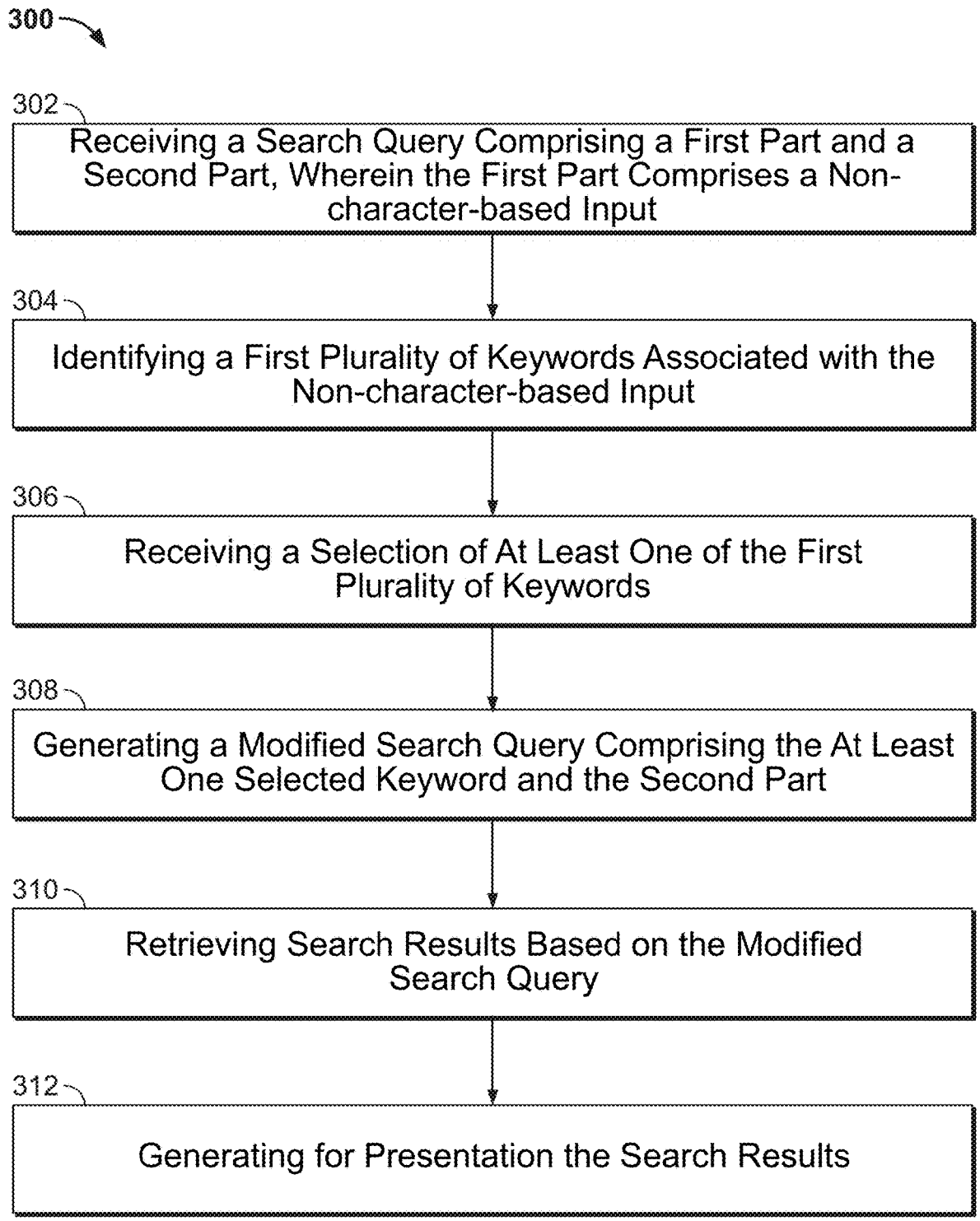
FIG. 3 is a flowchart representing a process for searching a search query having a non-character-based input, in accordance with some embodiments of the disclosure.

FIG. 3 is a flowchart representing an illustrative process 300 for searching a search query having an NCB input, in accordance with some embodiments of the disclosure. The process 300 comprises a step 302 of receiving, via input circuitry 202, a search query comprising a first part and a second part, wherein the first part comprises an NCB input, e.g., a first NCB input. The second part may be a CB input or another NCB input.

The process 300 comprises a step 304 of identifying, using control circuitry 204, a first plurality of keywords associated with the NCB input. For example, step 304 may be performed using (but not limited to) at least one of the color recognition module 210, the image recognition module 212, the shape recognition module 214, the crawler module 216, and the keyword retrieval module 218. For example, step 304 may comprise using the color and the shape recognition modules 210, 214 to recognize an entity in an image, such as an image of a vehicle, e.g., a red car. Upon recognizing that the NCB input contains the color red, one or more keywords relating to the color "red" may be retrieved, e.g., using the crawler module 216 and the keyword retrieval module 218 in communication with the memory 226. Upon recognizing that the NCB input contains the shape of a car, one or more keywords relating to the term "car" may be retrieved, e.g., using the crawler module 216 and the keyword retrieval module 218 in communication with the memory 226. The process may comprise a step of generating for presentation, e.g., on the user device 100 using the presentation circuitry 224, the retrieved first plurality of keywords associated with the NCB input, e.g., a list of keywords relating to the color "red" and to the term "car". The retrieved first plurality of keywords associated with the NCB input may be displayed on the user device 100 on which the search query was input. However, in another example, the retrieved first plurality of keywords associated with the NCB input may be displayed on another device.

The process 300 comprises a step 306 of receiving a selection of at least one of the first plurality of keywords. For example, the step 306 may comprise receiving a user input, e.g., at the user device 100, via input circuitry 202, comprising selecting at least one of the keywords displayed on the user device 100. In one example, the user may select one or more keywords associated with the color "red", since the image was used because the user was interested in the particular shade of red paint on the car. In another example, the user may select one or more keywords associated with the term "car", since the image was used because the user was interested in the particular model of the car shown in the image. In another example, the user may select one or more keywords associated with the color "red" and one or more keywords associated with the term "car", since the image was used because the user was interested in where they might be able to purchase a red car.

Where the second part comprises another NCB input, e.g., a second NCB input, steps 304 and 306 may be performed again in relation to the second NCB input to produce at least one user-selected keyword associated with the second NCB input.

The process 300 comprises a step 308 of generating a modified search query comprising the at least one selected keyword and the second part. For example, where the second part comprises a CB input, the step 308 may be performed using the query construction module 222, which is configured to construct a character string formed from the user-selected keywords associated with the first NCB input and the CB input. In another example, where the second part comprises the second NCB input, the step 308 may be performed using the query construction module 222, which is configured to construct a character string formed from the user-selected keywords associated with the first NCB input and the user-selected keywords associated with the second NCB input.

The process 300 comprises a step 310 of retrieving search results based on the modified search query. For example, the step 310 may comprise a step of transmitting, using the control circuitry 204, the modified search query to a remote search engine 228 to perform the search. The control circuitry 204 may be configured to retrieve the search results from the search engine once the search engine has performed the search. In another example, the control circuitry 204 may comprise a search engine module configure to retrieve directly the results of the search based on the modified search query.

The process 300 comprises a step 312 of generating for presentation the search results. For example, the step 312 may comprise causing the user device 100 to display the search results, e.g., using the presentation circuitry 224. The search results may be displayed using the same user device 100 used to input the initial search query or on another user device.

The actions or descriptions of FIG. 3 may be used with any other embodiment of this disclosure. In addition, the actions and descriptions described in relation to FIG. 3 may be done in any suitable alternative orders or in parallel to further the purposes of this disclosure.

Figure 4:
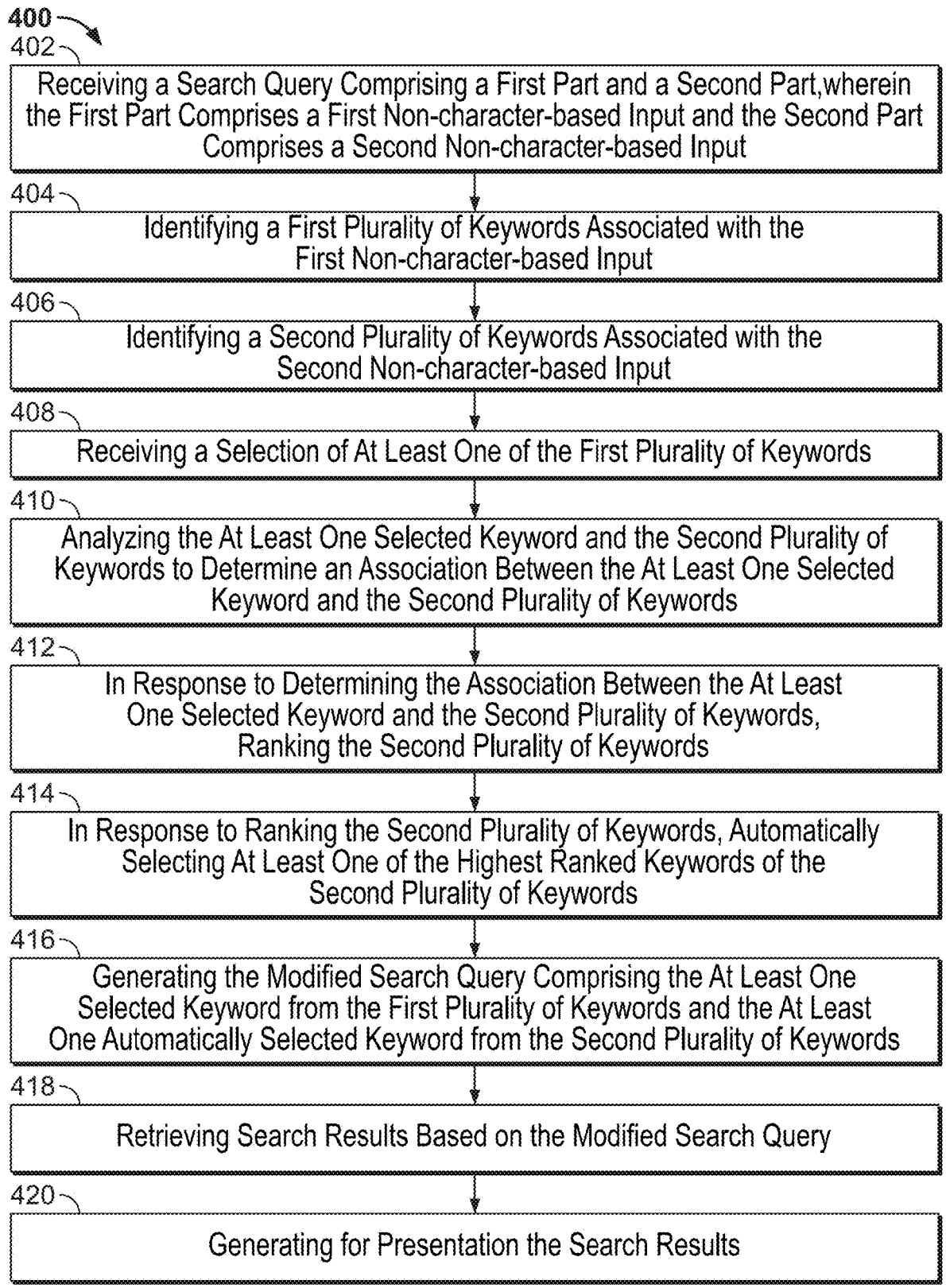
FIG. 4 is a flowchart representing a process for searching a search query having a non-character-based input, in accordance with some embodiments of the disclosure.

FIG. 4 is a flowchart representing an illustrative process 400 for searching a search query having an NCB input, in accordance with some embodiments of the disclosure. The process 400 comprises a step 402 of receiving, via input circuitry 202, a search query comprising a first part and a second part, wherein each of the first part and the second part comprise an NCB input, e.g., a first NCB input and a second NCB input. In the below example, the first NCB input comprises an image of a beach and the second NCB input comprises an image of an airplane.

The process 400 comprises a step 404 of identifying, using control circuitry 204, a first plurality of keywords associated with the first NCB input. For example, step 404 may be performed using (but not limited to) at least one of the color recognition module 210, the image recognition module 212, the shape recognition module 214, the crawler module 216, and the keyword retrieval module 218. For example, the image recognition module 212 may be used to identify that the image is an image of a beach, and the crawler module may be used to identify one or more keywords associated with the image, e.g., "Sun", "Sand", "Sea", "Palm Tree", etc. Additionally or alternatively, the control circuitry may be configured to access metadata associated with the image to identify the list of keywords 118. In one example, the image may have directly associated or embedded metadata in the form of one or more tags corresponding to various entities shown in the image. Additionally or alternatively, the control circuitry may be configured to access memory, e.g., a database, in order to identify the list of keywords based on metadata associated with the image. In this manner, the list of identified keywords may comprise the image title and/or at least one tagged entity in the image, such as "Santa Monica", "Santa Monica Beach at Sunrise" and a particular hotel shown in the image, e.g., "Lowes Resort Santa Monica". The process 400 may comprise a step of generating for presentation, e.g., on the user device 100 using the presentation circuitry 224, the retrieved first plurality of keywords associated with the NCB input, e.g., a list of keywords comprising, but not limited to, the words "Sun", "Sand", "Sea", "Palm Tree", "Santa Monica", "Santa Monica Beach at Sunrise" and "Lowes Resort Santa Monica". The retrieved first plurality of keywords associated with the NCB input may be displayed on the user device 100 on which the search query was input. However, in another example, the retrieved first plurality of keywords associated with the NCB input may be displayed on another device.

The process 400 comprises a step 406 of identifying, using control circuitry 204, a second plurality of keywords associated with the second NCB input. Step 406 may be carried out in a similar manner to step 404, and may be performed before, after or at the same time as step 404. For example, the image recognition module 212 may be used to identify that the image is an airplane, and the crawler module may be used to identify one or more keywords associated with the image, e.g., "Flight", "Sky", "Wings", "Cloud", etc. Additionally or alternatively, the list of identified keywords may be identified using metadata associated with the image, and comprise the image title and/or at least one tagged entity in the image, such as "Airbus A220-100", and a particular airline, e.g., "Delta Air Lines". The process 400 may comprise a step of generating for presentation, e.g., on the user device 100 using the presentation circuitry 224, the retrieved first plurality of keywords associated with the NCB input, e.g., a list of keywords comprising, but not limited to, the words "Flight", "Sky", "Wings", "Cloud", "Airbus A220-100", and "Delta Air Lines".

The process 400 comprises a step 408 of receiving a selection of at least one of the first plurality of keywords. For example, the step 408 may comprise receiving a user input, e.g., at the user device 100, via input circuitry 202, the user input comprising selecting at least one of the first plurality of keywords displayed on the user device 100. In one example, where the user is interested in traveling to the beach in the image and was unaware or could not remember where the beach is, the user may select the word "Santa Monica" from the first plurality of keywords.

The process 400 comprises a step 410 of analyzing, e.g., using the query construction module 222, the at least one selected keyword of the first plurality of keywords and the second plurality of keywords to determine an association between the at least one selected keyword and the second plurality of keywords. For example, where the user selects the word "Santa Monica", the query construction module 222 may determine that there is more of an association, e.g., a higher weighting, between "Santa Monica" and the terms "Flight", "Airbus A220-100", and "Delta Air Lines", e.g., by virtue of Santa Monica having an airport. However, the association between the at least one selected keyword and the second plurality of keywords may be made in any appropriate manner. The query construction module 222 may determine that there is less of an association, e.g., a lower weighting, between "Santa Monica" and the terms "Sky", "Wings" and "Cloud".

The process 400 comprises a step 412 of, in response to determining the association between the at least one selected keyword and the second plurality of keywords, ranking the second plurality of keywords, e.g., using the ranking module 220. The ranking may be performed by ordering the second plurality of keywords depending on their weighted association with the selected keyword from the first plurality of keywords. As such, the ranking module 220 may rank, at step 412, the second plurality of keywords in the order "Flight", "Delta Air Lines", "Airbus A220-100", "Sky", "Wings", and "Cloud". The process may comprise a step of generating for presentation, e.g., on the user device 100 using the presentation circuitry 224, the ranked keywords associated with the second NCB input. The ranked keywords associated with the second NCB input may be displayed on the user device 100 on which the search query was input. However, in another example, the ranked keywords associated with the second NCB input may be displayed on another device. In one example, the ranked keywords may be presented to the user for user selection. For example, the process 400 may comprise a step of receiving, e.g., from the user a selection of at least one of the ranked keywords. The ranking of the keywords is beneficial as it provides the user with keywords that are more appropriate given the context of their search.

The process 400 comprises a step 414 of, in response to ranking the second plurality of keywords, automatically selecting at least one of the highest ranked keywords of the second plurality of keywords, e.g., using the query construction module 222. For example, step 414 may comprise automatically selecting at least one of the ranked keywords having an association weighting above a predetermined threshold. Using the above example, the terms "Flight" and "Delta Air Lines" may have a sufficiently high ranking, e.g., association weighting, such that they are automatically selected by the query construction module 222, and the terms "Airbus A220-100", "Sky", "Wings", and "Cloud" may have a sufficiently low ranking, e.g., association weighting, such that they are automatically not selected by the query construction module 222. In this manner, the query construction module 222 is able to automatically construct a search query using the first NCB input to add context to the second NCB input.

The process 400 comprises a step 416 of generating a modified search query comprising the at least one selected keyword of the first plurality of keywords and the automatically selected at least one keyword from the second plurality of keywords. For example, the step 316 may be performed using the query construction module 222, which is configured to construct a character string formed from the user-selected keyword(s) associated with the first NCB input and the automatically selected keyword(s) associated with the second NCB input. For example, the query construction module 222 may construct a search query comprising the terms "Santa Monica", "Flight", and "Delta Air Lines". In one example, process 400 may comprise a step of allowing the user to change the modified search query, e.g., by at least one of: subtracting one or more of the automatically selected keywords; adding one or more keywords from the first and second lists of keywords; and adding one or more other user defined keywords. For example, the user may wish to remove the term "Delta Air Lines" from the modified search query where they decide to widen the search to include other airlines. In another example, the user may wish to add another NCB input to the modified search query. In such an example, the above steps in relation to automatically selecting one or more keywords identified by the second NCB input may be repeated for the further NCB input.

The process 400 comprises a step 418 of retrieving search results based on the modified search query. For example, the step 418 may comprise a step of transmitting, using the control circuitry 204, the modified search query to a remote search engine 228 to perform the search. The control circuitry 204 may be configured to retrieve the search results from the search engine once the search engine has performed the search. In another example, the control circuitry 204 may comprise a search engine module configure to retrieve directly the results of the search based on the modified search query.

The process 400 comprises a step 420 of generating for presentation the search results. For example, the step 420 may comprise causing the user device 100 to display the search results, e.g., using the presentation circuitry 224. The search results may be displayed using the same user device 100 used to input the initial search query or on another user device. Using the above example, the search results may comprise a series of links whereby the user can book a flight to Santa Monica, e.g., on Delta Air Lines.

The actions or descriptions of FIG. 4 may be used with any other embodiment of this disclosure. In addition, the actions and descriptions described in relation to FIG. 4 may be done in any suitable alternative orders or in parallel to further the purposes of this disclosure.

Figure 5:
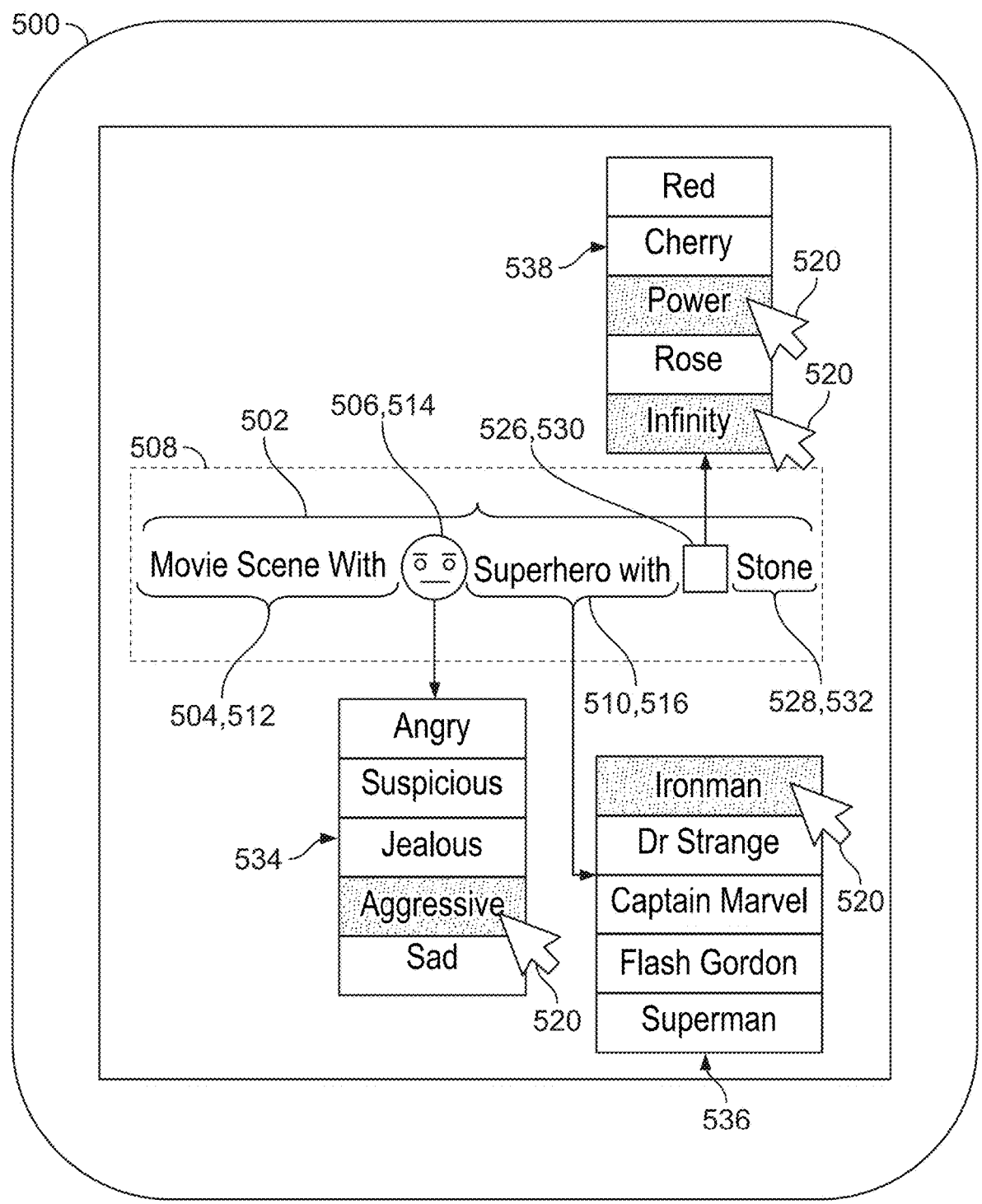
FIG. 5 illustrates an exemplary system and method for searching a search query having a non-character-based input, in accordance with some embodiments of the disclosure.
Figure 6:
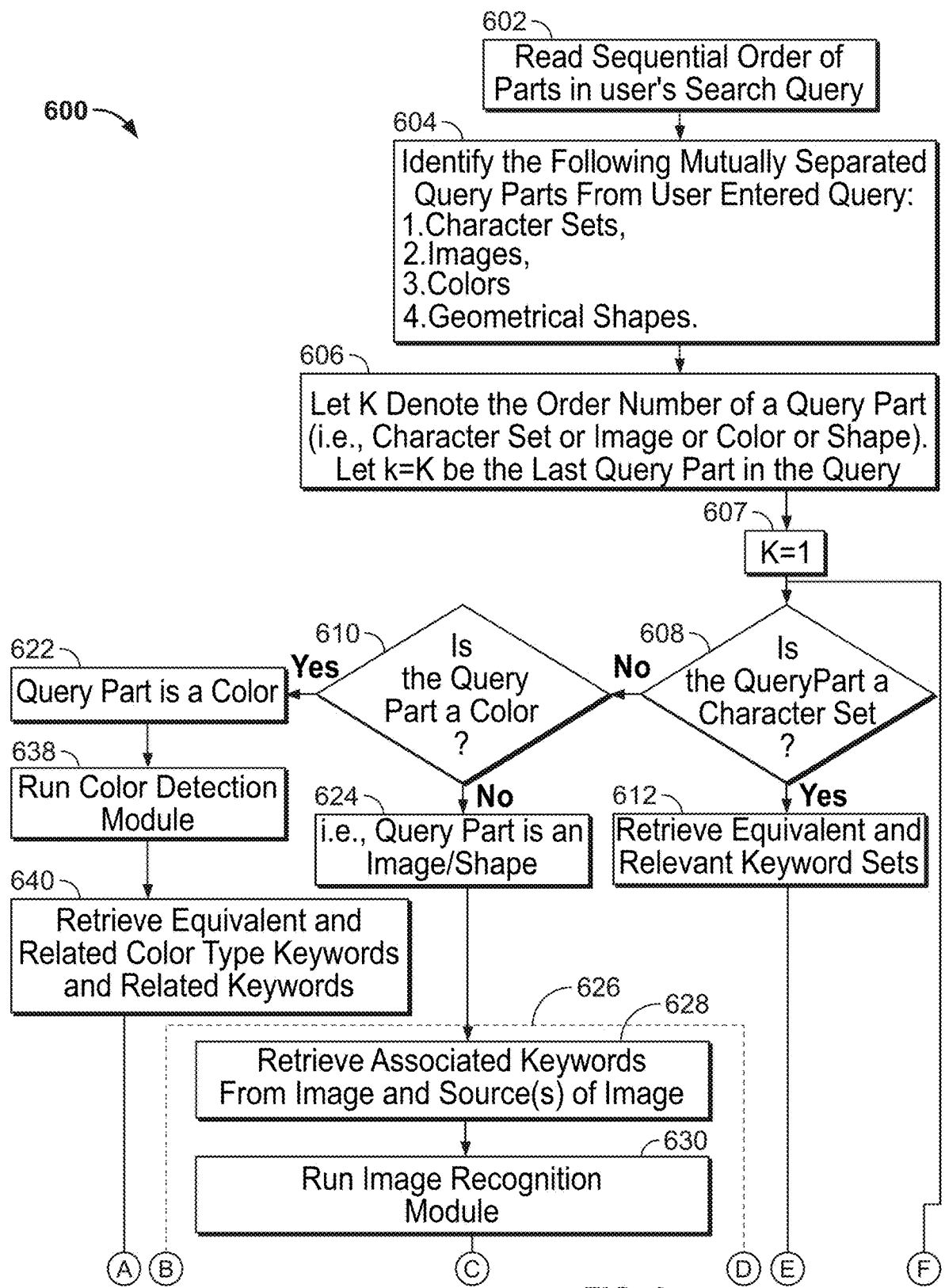
FIG. 6 is a flowchart representing a process for searching a search query having a non-character-based input, in accordance with some embodiments of the disclosure.
Figure 6:
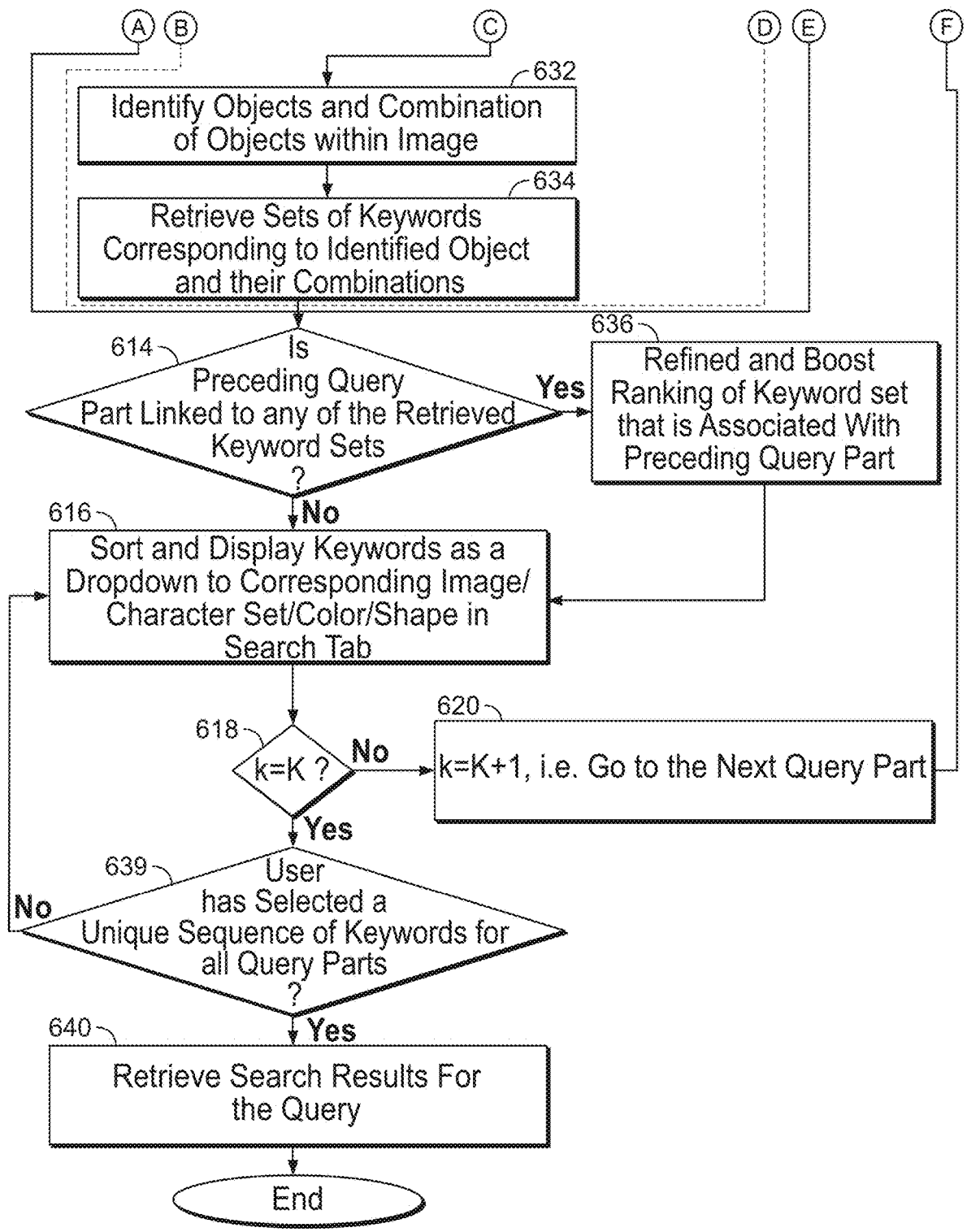

FIG. 5 illustrates an exemplary system and method for searching, e.g., on a user device 500, a search query 502 having at least one NCB input, in accordance with some embodiments of the disclosure. FIG. 6 is a flowchart representing an illustrative process 600 for searching the exemplary search query 502 that is illustrated in FIG. 5. However, it is understood that the process 600 is not limited to searching the exemplary search query 502, and process may be used on any appropriate example.

The search query 502 in the example shown in FIG. 5 comprises a first part 504, a second part 506, a third part 510, a fourth part 526 and a fifth part 528. The first part 504 comprises a CB input 512 comprising the text "Movie scene with". The second part 506 comprises an NCB input 514 comprising an image, which in this example is an emoji. However, the NCB input 514 may be any appropriate type of input containing an image, a shape, or a color (either separately or in combination). The user may acquire the image from any appropriate source. For example, the user may select the emoji from a list of emojis provided as part of an on-screen keyboard on the user device 500. The third part 510 comprises another CB input 516 comprising the text "superhero with". The fourth part 526 comprises another NCB input 530 which in this example is the color red, depicted as a red square for the sake of illustration only. The color red may be selected from a color palate provided alongside the search field 508, which allows a user to choose from offline and online exemplary colors for use in the search query 502. The fifth part 528 comprises another CB input 532 comprising the text "stone".

For the sake of clarity, it is understood that the use of the terms "first part", "second part", "third part", "fourth part" and "fifth part" are in relation to the order the CB inputs and the NCB input entered into the search field 508 in the example shown in FIG. 5. It is understood that the present disclosure in no way limits the order or arrangement of CB and NCB inputs to that shown in any of the FIGS. or to that described in any of the examples disclosed herein.

Taking the search query 502 shown in FIG. 5 as an example, process 600 comprises a step 602 of reading the (sequential) order of the first to fifth parts 504, 506, 510, 526, 528, e.g., using input processing circuitry 224. Process 600 comprises a step 604 of identifying, e.g., using input processing circuitry 224, each of the parts 504, 506, 510, 526, 528 of the search query 502 as separate inputs, e.g., as either a CB input or an NCB input. Where a part is identified as an NCB input, it may be further identified as comprising at least one of an image, a color and a shape. The process 600 comprises a step 606 of denoting the order number k of each of the parts 504, 506, 510, 526, 528 of the search query 502. For example, the first part 504 may be denoted as k=1, the second part 506 may be denoted as k=2, and so on. The last part in the search query 502, which in this case is the fifth part 528, may be denoted as k=K. The process may comprise a step of generating a data structure into which the parts 504, 506, 510, 526, 528 of the search query 502 are entered along with their respective order number k. The process 600 comprises a step 607 of calling up the first part 504 of the search query 502, e.g., from the data structure, by accessing the order number k=1.

The process 600 comprises a step 608 determining if the first part 504 comprises a CB input, such as a character set or character string, e.g., using the character recognition module 208. If it is determined that the first part 504 comprises a CB input, the process 600 may move directly to step 618, which is described below, and if it is determined that the first part 504 comprises an NCB input, the process 600 moves to step 610. Alternatively, if it is determined that the first part 504 comprises a CB input, the process 600 may move to step 612, and if it is determined that the first part 504 comprises an NCB input, the process 600 moves to step 610. In the example shown in FIG. 5, the first part 504 comprises the CB input 512 made up from the character string "Movie scene with", and, as such, the process moves to step 610, which comprises retrieving equivalent/relevant keywords associated with the CB input 512, e.g., using the keyword retrieval module 218. In some examples, the keyword retrieval module 218 may not retrieve any equivalent/relevant keywords, e.g., any sufficiently equivalent/relevant keywords, and the process may move directly to step 618, which is described below. Additionally or alternatively, the character recognition module 208 may be configured to ignore words such as prepositions or conjunctions. Thus, in one example, the CB input 512 may be interpreted at the character string "Movie scene", and the keywords may be retrieved accordingly.

Process 600 comprises a step 614 of determining if the preceding search query part is linked or associated with the retrieved equivalent/relevant keywords associated with the CB input 512, e.g., using control circuitry 204. In the example shown in FIG. 5, the first part 504 of the search query 502 does not have a preceding search query part, and the process 600 moves, e.g., by default, to step 618, which is described below. Additionally or alternatively, the process 600 may comprise a step of determining if the following search query part is linked or associated with the retrieved equivalent/relevant keywords.

Process 600 comprises the step 616 of displaying, e.g., sorting and displaying, the keywords as a list in a dropdown menu, where appropriate. Step 616 will be described in more detail below in relation to the second, third and fourth parts 506, 510, 526 of the search query 502.

Process 600 comprises the step 618 of determining if the current search query part is the last of the search query parts identified in step 604. For example, step 618 may comprise determining if the order number k=K. Where it is determined that the order number k+K, process 600 moves to step 620, which comprises increasing the order number k by one increment, e.g., by k=k+1. The process 600 comprises a step of calling up the next part, e.g., the second part 506, of the search query 502, e.g., from the data structure, by accessing the order number k=2. Process 600 then returns to step 608.

In the example shown in FIG. 5, the second part 506 comprises the NCB input 514, which in this case is an emoji. As such, process 600 moves to step 610, since the second part 506 does not comprise a CB input. At step 620, process 600 determines if the second part 506 comprises a color. Where it is determined that the second part 506 comprises a color, process 600 moves on to step 622, which is described later. Where it is determined that the second part 506 does not comprise a color, process 600 moves on to step 624, which identifies the second part 506 as an image or a shape.

Process 600 comprises step 626, which comprises retrieving, e.g., using keyword retrieval module 218, keywords associated with the second part 506, e.g., keywords associated with the emoji. The keywords may be retrieved by virtue of at least one of the following sub-steps: step 628, which comprises retrieving associated keywords using metadata associated with the second part 506 (or the source of the second part 506); step 630, which comprises running at least one of the image recognition module 212 and the shape recognition module 214; step 632, which comprises identifying an entity (or a combination of entities) in the second part 506; and step 634, which comprises retrieving keywords associated with the identified entities (or their combinations). Following the retrieval of the keywords associated with the second part 506, process moves to step 614, where it is determined if the preceding search query part, e.g., the first part 504, is linked to any of the retrieved keywords for the second part 506. In the example shown in FIG. 5, there is no link between the first part 504 and the second part 506, and so process 600 moves onto step 616.

At step 616, the keywords retrieved for the second part 506 are displayed, e.g., on a display of the user device 500, as a list of keywords 534. In the example shown in FIG. 5, the list of keywords 534 comprises, but is not limited to, the words "Angry", "Suspicious", Jealous", "Aggressive" and "Sad".

Process 600 comprises a step (not shown) of receiving a user selection, e.g., using cursor 520, of at least one of the words from the list of keywords 534. In the example shown in FIG. 5, the user has selected the word "Aggressive", since this is the emotion/characteristic that the user was trying to convey by using the emoji in the search query 502.

Process 600 then moves to steps 618 and 620, where the order number is increased by another increment to k=3, which represents the third part 510 of the search query 502, which in the example shown in FIG. 5 is the character string "superhero with" (which may be reduced to "superhero" in some examples). Process 600 then repeats steps 608 and 612 as described above, and moves onto step 614, where process 600 determines if there is a link between the retrieved keyworks for the term "superhero" and the preceding search query part 506. Additionally or alternatively, process 600 determines if there is a link between the retrieved keywords for the term "superhero" and the selected keyword relating to the preceding search query part 506. In the example shown in FIG. 5, there is a link between the term "superhero" and the selected keyword "Aggressive", since superheroes are often portrayed in movies and comics as aggressive characters, e.g., during fight scenes. As such, process 600 moves to step 636, which comprises refining and ordering (e.g., by virtue of boosting the ranking of) the retrieved keywords relating to the second part 506 based on a weighting between the term "Aggressive" and each of the retrieved keywords.

Process 600 moves onto step 616, which comprises displaying the retrieved keywords relating to the second part 506 in a list of keywords 536, the list of keywords 536 being displayed with the highest weighted retrieved keyword at the top of the list 536. In the example shown in FIG. 5, the list of keywords comprise a list of superheroes who may exhibit more aggressive attributes than other superheroes, e.g., "Ironman", "Dr Strange", Captain Marvel", "Flash Gordon", and "Superman", wherein the most aggressive of those superheroes is deemed to be "Ironman".

Process 600 comprises a step (not shown) of receiving a user selection, e.g., using cursor 520, of at least one of the words from the list of keywords 536. In the example shown in FIG. 5, the user has selected the word "Ironman", since this is the superhero that the user has intended to search for.

Process 600 then moves to steps 618 and 620, where the order number is increased by another increment to k=4, which represents the fourth part 526 of the search query 502, which in the example shown in FIG. 5 is the color red. As described above, process 600 moves onto steps 608, 610 and 622, since the fourth part 526 comprises an NCB input comprising a color. Once the fourth part 526 has been identified, process 600 moves on to step 638, which comprises running the color recognition module 208, and onto step 640, which comprises retrieving equivalent/relevant keywords associated with the color. In the example shown in FIG. 5, the color is the color red that has been selected from a palate of colors and is depicted in the shape of a square for the sake of example only. As described above in relation to the other embodiments of the disclosure, the retrieved keywords may be based on at least one of the other parts of the search query 502, e.g., either alone or in combination with one or more retrieved keywords relating to another part (or parts) of the search query 502. In this manner, the keywords that are retrieved for the fourth part 526, e.g., the color red, may include derivatives of one or more of the other parts of the search query 502.

Process 600 moves onto step 614, where it is determined if the retrieved keywords associated with the color red are associated with the retrieved keywords relating to the preceding part of the search query, e.g., the third part 510.

Process 600 moves to step 636, since it is determined that there is a link between the color red and the selected term "Ironman", e.g., since Ironman has a red costume. Moreover, step 636 comprises boosting the ranking of one or more of the retrieved keywords that are also derivatives from the term "Ironman". For example, step 616 comprises sorting and displaying the retrieved keywords in the order of "Red", "Cherry", "Power", "Rose" and "Infinity".

Process 600 comprises a step (not shown) of receiving a user selection, e.g., using cursor 520, of at least one of the words from the list of keywords 538. In the example shown in FIG. 5, the user has selected the words "Power" and "Infinity", since these are the desired adjectives that describe the following search query part.

Process 600 then moves to steps 618 and 620, where the order number is increased by another increment to k=K, which represents the fifth part 528 of the search query 502, which in the example shown in FIG. 5 is the word "stone". As described above, process 600 moves on to steps 608 and directly to step 618, e.g., since the keyword retrieval module 218 was unable to determine keywords relating to the term "stone" having a sufficient relevance to one or more of the other search query parts.

At step 618, it is determined that the fifth part 528 of the search query 502 is the final search query part from those identified at step 604. As a result, process 600 moves on to step 639, where it is determined if the user has selected a unique sequence of keywords from the lists of retrieved keywords 534, 536, 538. In the example shown in FIG. 5, the user has selected keywords such that the resultant search query, i.e., the modified search query, reads "Movie scene with aggressive Ironman with (power AND infinity) stone". If the modified search query were not to be unique enough for the control circuitry to generate search results, process 600 would return to step 616 to allow the user to select a different sequence of keywords to form the basis of the modified search query. Where the modified search query is sufficiently unique for a search to be performed, e.g., by search engine 228, process 600 comprises a step 640 of retrieving search results for the modified search query. In the example shown in FIG. 5, the search results may relate to a scene from the movie Avengers: EndGame in which the character Ironman wields the Power Stone and the Infinity Stone in an epic battle scene.

The actions or descriptions of FIGS. 5 and 6 may be used with any other embodiment of this disclosure. In addition, the actions and descriptions described in relation to FIGS. 5 and 6 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
  receiving a voice query during navigation or play of a portion of a content item;
  determining a character-based (CB) input based on the voice query;
  determining a plurality of keywords based at least in part on the portion of the content item;
  generating for display on a single screen the portion of the content item, the CB input, and the plurality of keywords;
  receiving a selection of at least one of the plurality of keywords;
  based at least in part on the selection of the at least one of the plurality of keywords, generating a modified search query based at least in part on the CB input and the at least one selected keyword from the plurality of keywords; and generating for display one or more results of the modified search query.

2. The method of claim 1, wherein the determining the plurality of keywords comprises:
accessing metadata embedded in the portion of the content item wherein the metadata comprises one or more tags corresponding to various entities shown in the portion of the content item.

3. The method of claim 1, wherein the determining the plurality of keywords comprises:
accessing memory based on metadata associated with the content item wherein the metadata associated with the content item comprises a title of the content item.

4. The method of claim 1, wherein the determining the plurality of keywords comprises:
selecting a frame from the portion of the content item; and
accessing metadata associated with the frame.

5. The method of claim 1, wherein the determining the plurality of keywords comprises:
accessing memory based on metadata associated with the CB input wherein the CB input comprises a reference to an entity.

6. The method of claim 1, further comprising:
determining a relevance weight for each keyword of the plurality of keywords; and
selecting a subset of the plurality of keywords based on the relevance weight for each keyword; and
wherein the generating for display on the single screen the portion of the content item, the CB input, and the plurality of keywords comprises generating for display on the single screen the portion of the content item, the CB input, and the subset of the plurality of keywords.

7. The method of claim 1, wherein the receiving the selection of at least one of the plurality of keywords comprises a selection of two keywords, the method further comprising:
determining a meaning of the selection of the two keywords based on comparing the two keywords based on at least one user-selected Boolean operator.

8. The method of claim 1, further comprising:
receiving input to reorder the CB input and the at least one selected keyword from the plurality of keywords; and
generating the modified search query based on the input to reorder the CB input and the at least one selected keyword from the plurality of keywords.

9. The method of claim 1, wherein the generating for display the one or more results of the modified search query comprises generating for display the modified search query and the one or more results of the modified search query.

10. The method of claim 1, further comprising:
determining a relevance of each result of the one or more results of the modified search query;
determining an order for the one or more results of the modified search query; and
generating for display the one or more results of the modified search query in the determined order.

11. A system comprising:
Input/Output (I/O) circuitry configured to:
receive a voice query during navigation or play of a portion of a content item;
control circuitry configured to:
determine a character-based (CB) input based on the voice query;
determine a plurality of keywords based at least in part on the portion of the content item;
I/O circuitry further configured to:
generate for display on a single screen the portion of the content item, the CB input, and the plurality of keywords;
control circuitry further configured to:
receive a selection of at least one of the plurality of keywords; and
based at least in part on the selection of the at least one of the plurality of keywords, generating a modified search query based at least in part on the CB input and the at least one selected keyword from the plurality of keywords; and
I/O circuitry further configured to:
generate for display one or more results of the modified search query.

12. The system of claim 11, wherein the control circuitry is further configured to determine the plurality of keywords by:
accessing metadata embedded in the portion of the content item wherein the metadata comprises one or more tags corresponding to various entities shown in the portion of the content item.

13. The system of claim 11, wherein the control circuitry is further configured to determine the plurality of keywords by:
accessing memory based on metadata associated with the content item wherein the metadata associated with the content item comprises a title of the content item.

14. The system of claim 11, wherein the control circuitry is further configured to determine the plurality of keywords by:
selecting a frame from the portion of the content item; and
accessing metadata associated with the frame.

15. The system of claim 11, wherein the control circuitry is further configured to determine the plurality of keywords by:
accessing memory based on metadata associated with the CB input wherein the CB input comprises a reference to an entity.

16. The system of claim 11, wherein the control circuitry is further configured to:
determine a relevance weight for each keyword of the plurality of keywords; and
select a subset of the plurality of keywords based on the relevance weight for each keyword; and
wherein the I/O circuitry is further configured to generate for display on the single screen the portion of the content item, the CB input, and the plurality of keywords by generating for display on the single screen the portion of the content item, the CB input, and the subset of the plurality of keywords.

17. The system of claim 11, wherein the selection of at least one of the plurality of keywords comprises a selection of two keywords, wherein the control circuitry is further configured to:
determine a meaning of the selection of the two keywords based on comparing the two keywords based on at least one user-selected Boolean operator.

18. The system of claim 11, wherein the control circuitry is further configured to:
receive input to reorder the CB input and the at least one selected keyword from the plurality of keywords; and
generate the modified search query based on the input to reorder the CB input and the at least one selected keyword from the plurality of keywords.

19. The system of claim 11, wherein the control circuitry is further configured to generate for display the one or more results of the modified search query and generate for display the modified search query and the one or more results of the modified search query.

20. The system of claim 11, wherein:
the control circuitry is further configured to:
determine a relevance of each result of the one or more results of the modified search query;
determine an order for the one or more results of the modified search query; and
the I/O circuitry is further configured to:
generate for display the one or more results of the modified search query in the determined order.

* * * * *